United States Patent
Maguire et al.

(10) Patent No.: US 7,802,474 B2
(45) Date of Patent: *Sep. 28, 2010

(54) FIBER OPTIC LASER ACCELEROMETER

(75) Inventors: Jason M. Maguire, Middletown, RI (US); Gregory H. Ames, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 423 days.

This patent is subject to a terminal disclaimer.

(21) Appl. No.: 11/934,850

(22) Filed: Nov. 5, 2007

(65) Prior Publication Data

US 2010/0024551 A1 Feb. 4, 2010

(51) Int. Cl.
*G01P 15/08* (2006.01)
(52) U.S. Cl. .................... 73/514.16; 73/514.26
(58) Field of Classification Search .......... 73/514.16, 73/514.34, 514.29, 514.26, 763–768, 774–783; 356/32–34, 35.5, 227.27, 227.19, 227.15

See application file for complete search history.

(56) References Cited

U.S. PATENT DOCUMENTS

| 5,099,690 | A | * | 3/1992 | Califano | 73/510 |
| 5,365,770 | A | * | 11/1994 | Meitzler et al. | 73/24.06 |
| 5,903,349 | A | * | 5/1999 | Vohra et al. | 356/477 |
| 6,955,085 | B2 | * | 10/2005 | Jones et al. | 73/514.26 |
| 7,661,313 | B2 | * | 2/2010 | Maguire et al. | 73/514.16 |

* cited by examiner

*Primary Examiner*—Helen C. Kwok
(74) *Attorney, Agent, or Firm*—James M. Kasischke; Michael P. Stanley; Jean-Paul A. Nasser

(57) ABSTRACT

An accelerometer is provided for a fiber optic laser. Strain applied to the fiber optic laser results in an emission wavelength shift. The fiber optic laser is joined to a transducer and extends laterally across said transducer. Acceleration of the transducer in a predefined direction causes strain in said fiber optic laser. The transducer can have many possible designs. There is further provided a system for sensing acceleration which includes a pumping laser and a distributor joined to the fiber optic laser. Return signals from the fiber optic laser are provided to an interferometer and analysis circuitry. In the absence of a transducer, the system can operate as a strain sensor.

13 Claims, 2 Drawing Sheets

FIBER OPTIC LASER ACCELEROMETER

STATEMENT OF GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to a fiber optic sensors and more particularly to a fiber optic accelerometer.

(2) Description of the Prior Art

Linear fiber optic arrays are used in Navy tactical and surveillance towed array applications as well as commercial towed seismic streamer applications for oil and gas exploration. Linear arrays may also be used in ocean bottom applications or placed down oil wells for oil field monitoring.

Fiber optic sensor arrays use interferometers and lasers to interrogate a plurality of sensors formed in an optical fiber. Typically these sensors are made from a fiber optic sensing segment positioned between two reflective portions. The sensing segment is usually wound on a compliant mandrel. Acoustic pressure on the sensor results in strain in the fiber optic sensing segment. Strain in the fiber optic sensing segment is measured using the interferometer. Various schemes such as wavelength division multiplexing and time division multiplexing exist for increasing the number of sensors on a single optical fiber. Fiber optic sensor arrays are also known that use multiplexed fiber laser sensors to provide an acoustic pressure signal.

A newer type of electronic linear sonar array is a vector sensor array. A vector sensor array uses sensor elements that provide a vector reading of the acoustic field, rather than just the scalar pressure. A typical form of the sensor element involves a combination of 2 or 3 orthogonal accelerometers and a pressure sensor.

Such a vector sensor array has several potential advantages over linear arrays of pressure sensors. Because of the added directionality of the individual element, the gain is increased per unit array length. A single linear array can resolve the left-right bearing ambiguity seen in pressure sensor arrays. Finally, the array can increase effective gain against anisotropic background noise fields. Previous linear vector sensor arrays have used conventional (non-fiber optic) accelerometers and pressure sensors combined with electronic telemetry. They have shared the same intensive, complicated hand assembly techniques that have resulted in high cost and low reliability in pressure sensor arrays.

It is therefore the intent of this invention to provide a directional fiber optic accelerometer that can be used to form a linear array of vector sensors.

SUMMARY OF THE INVENTION

Accordingly, there is provided an accelerometer utilizing a fiber optic laser. Strain applied to the fiber optic laser results in an emission wavelength shift. The fiber optic laser is joined to a transducer and extends laterally across the transducer. Acceleration of the transducer in a predefined direction causes strain in said fiber optic laser. The transducer can have many possible designs. There is further provided a system for sensing acceleration which includes a pumping laser and a distributor joined to the fiber optic laser. Return signals from the fiber optic laser are provided to an interferometer and analysis circuitry. In the absence of a transducer, the system can operate as a strain sensor.

BRIEF DESCRIPTION OF THE DRAWINGS

The foregoing invention will become readily apparent by referring to the following detailed description and the appended drawings in which.

DESCRIPTION OF THE PREFERRED EMBODIMENT

Figure 1:
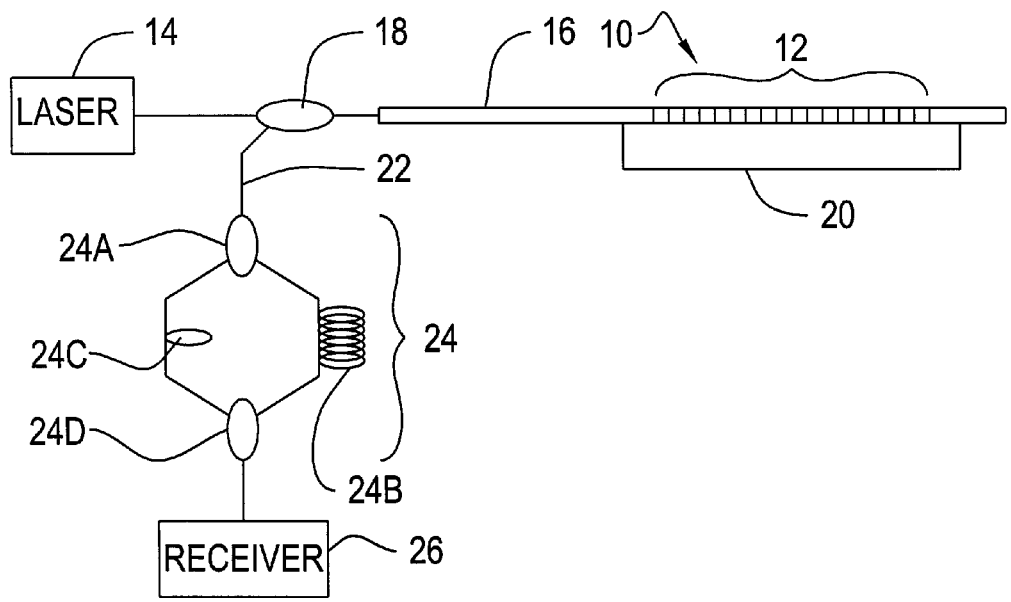
FIG. 1 is a diagram showing a fiber optic laser sensor accelerometer.

FIG. 1 provides a first embodiment of a fiber laser accelerometer 10. The fiber laser accelerometer 10 includes a fiber laser 12. Fiber laser 12 can be either a Fabry-Perot type cavity fiber laser or a distributed feedback fiber laser. In a Fabry-Perot type fiber laser, the laser cavity is a length of erbium-doped optical fiber with a Bragg grating written in the fiber core at one end of the laser cavity, with another Bragg grating or other reflector at the other end of the laser cavity. In a distributed feedback fiber laser, the fiber laser cavity is a length of erbium-doped optical fiber having a grating written over the full length of the cavity. The distributed feedback fiber laser will have a phase shift written into the grating at the center of the cavity. A pump laser 14 is provided for transmitting coherent light through optical fiber 16. Pump laser 14 can be any laser such as a diode laser operating at 980 nm or 1480 nm. Pump laser 14 is joined by fiber 16 to a distributor 18. Distributor 18 can be a wavelength division multiplexer, circulator or the like. Wavelength division multiplexer operates by providing light at the pump laser wavelength to the fiber laser 12. Returning light from the fiber laser 12 would be at a different frequency and would be guided along a different path. A circulator can carry out the same function by transferring light to the next port of the circulator.

After coherent light passes through distributor 18, it is absorbed by the doping material in fiber laser 12. Absorption of this light causes a gain inversion in the laser cavity that leads to laser emission. This causes fiber laser 12 to emit a narrow single mode of light. Fiber laser 12 is mounted to a transducer 20 such that acceleration of the transducer material is made to provide strain of the fiber laser cavity. Strain of the fiber laser cavity shifts the emission wavelength of the fiber laser 12. Transducer 20 can have a wide variety of constructions that will be discussed hereinafter.

Fiber laser emission returns along fiber 16 to wavelength division multiplexer 18 where it is separated onto analysis path 22. An interferometer 24 such as a Mach-Zehnder interferometer is positioned on analysis path 22. Interferometer 24 converts the shifted emission wavelength of fiber laser into a phase shift of the fiber laser light. Interferometer 24 typically includes a first beam splitter 24A having a delay loop 24B on one leg and a modulator 24C on the second leg. Signals from the delay loop 24B and modulator 24C are combined in a second beam splitter 24D to produce the phase shifted signal. Other designs can produce the same type of signal. A receiver 26 receives the phase shifted signal. Receiver 26 is capable of demodulating and detecting the signal from the fiber laser by various methods well known in the art. The signal from the fiber laser gives an indication of strain in the fiber laser.

Figure 2:
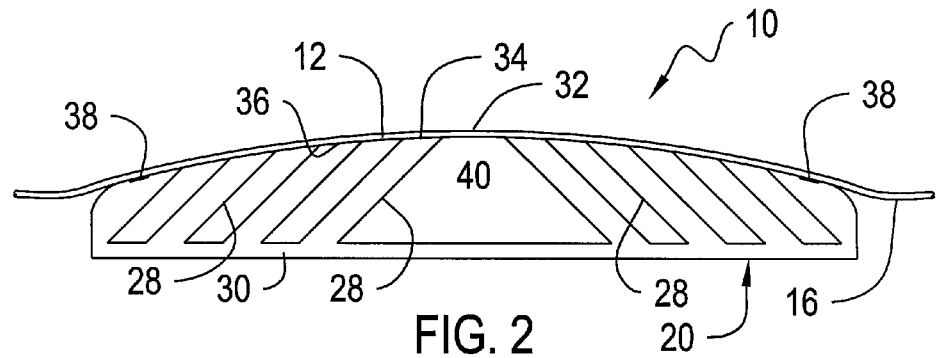
FIG. 2 is a diagram showing a fiber optic laser accelerometer having a transducer constructed according to a first embodiment.

FIG. 2 provides greater detail concerning the mounting of fiber laser 12 on transducer 20. Transducer 20 has at least one flap 28. Flap 28 is attached to a base 30 of the transducer 20 and extends toward fiber laser 12 at an angle. Equal numbers of flaps 28 can be provided on each side of a center 32 of the fiber laser 12, and all flaps 28 angle toward the center 32. Transducer 20 can be made from a polymer material that allows vertical movement of flaps 28, as shown, but resists movement in transverse direction. Movement in the longitudinal direction cannot be controlled without affecting the vertical motion induced by acceleration. The affect of the longitudinal motion tends to cancel out because of the flap arrangement. If the transducer 20 is to the right, the left flaps move up and the right flaps move down. The net strain on fiber laser 12 is low.

The volume in between flaps 28 can be a vacuum, gas, liquid, or solid; however, it should allow movement of flaps 28. A gas, liquid or solid could provide damping, if necessary. The combined top surfaces 34 of the flaps 28 forms an interrupted curved surface 36. The fiber laser 12 or fiber 16 extending beyond fiber laser 12 is mounted under tension across the top surfaces 34 of the flaps 28 and fixed to the outer two flaps with an adhesive 38 such as ultra-violet cured epoxy. Adhesive 38 may interfere with fiber laser 12 if applied to the laser grating region. Therefore the adhesive is preferably applied to the fiber region outside of the laser grating. Mounting to the outermost flaps 28 reduces the constraint on the ends of the fiber laser 12 and yields greater sensitivity to acceleration.

Interrupted curved surface 36 allows fiber laser 12 contact with all of the flap upper surfaces 34. Friction holds the fiber laser 12 in place laterally. The body of each flap 28 serves as an inertial mass. When transducer 20 is accelerated away from fiber laser 12, flaps 28 move toward fiber laser 12 and outward from the center 32 due to the angle of the flaps 28. This causes an unsupported portion 40 of the fiber laser 12 between the centermost two flaps 28 to be further tensioned, shifting the fiber laser emission frequency. The outer flaps 28 move with the inner flaps 28 and produce additional strain on the fiber portion at center 32. The outer flaps 28 also add their mass to the response to the acceleration.

The fiber laser 12 strain sensitivity is weighted by the mode profile. In a feedback laser, this is a strong exponential function centered at the center 32 of the fiber laser 12. Because of this, while the laser may be 50 mm long, the effective sensitive length may be only 8 mm. It is this effective length 40 which is positioned between the center two flaps 28. The flaps 28 have sufficient width in the direction perpendicular to the direction being sensed to ensure that the flaps 28 are much more stiff against motion in that direction. This stiffness in the transverse direction ensures that the accelerometer 10 has good isolation against responding to accelerations in that direction, known as cross-axis isolation. Transducer 20 structure also provides good isolation against longitudinal accelerations in the direction parallel to the fiber laser. In this direction, the half of the flaps 28 on one side of the center 32 move upward and outward, while the half of the flaps 28 on the other side of the center 32 move downward and inward. These two motions tend to cancel, producing little net strain on the center 32 of the fiber laser 12.

The unsupported fiber portion 40 between the center two flaps 28 can also vibrate in a string mode. This mode is undesirable because it is equally susceptible to acceleration in both directions transverse to the fiber laser 12. Thus, it is desirable to minimize this mode and push its resonance to a frequency above that in the sensing range. The response of this mode is controlled by mounting the fiber laser 12 to the transducer 20 with sufficient tension. The embodiment shown in FIG. 2 minimizes this tension.

Figure 3:
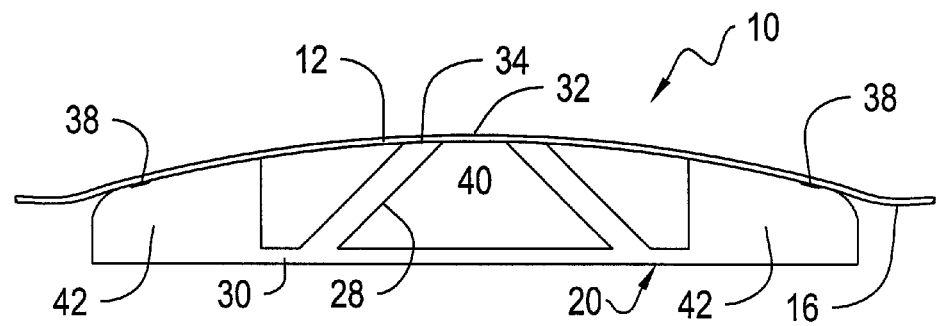
FIG. 3 is a diagram showing a fiber optic laser accelerometer having a transducer constructed according to a second embodiment.

FIG. 3 shows an embodiment of transducer 20 using only two opposing flaps 28 with the rest of the fiber laser attaching to solid material 42 on either side. In this embodiment the tension must be sufficient for the length of the unsupported span 40 between the flaps 28 and the solid material 42 to control the string mode of vibration on that fiber span 40. Attachment to the rigid structure 42 at either end of the fiber laser 12 stiffens the transducer 20 by limiting the motion of the center two flaps 28.

Figure 4:
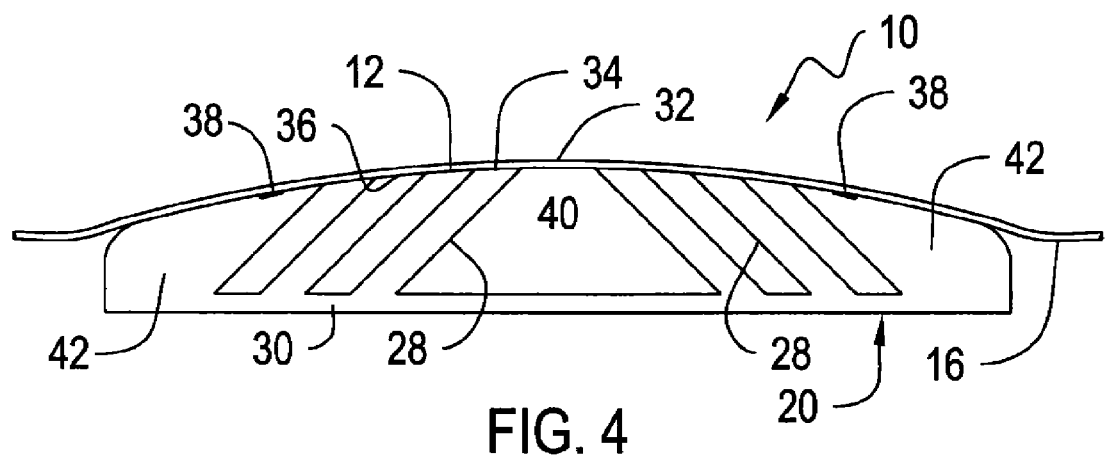
FIG. 4 is a diagram showing a fiber optic laser accelerometer having a transducer constructed according to a third embodiment.

FIG. 4 shows an embodiment where the fiber optic 16 is attached to rigid structure 42 at the end of transducer 20 beyond the last flaps 28.

Figure 5:
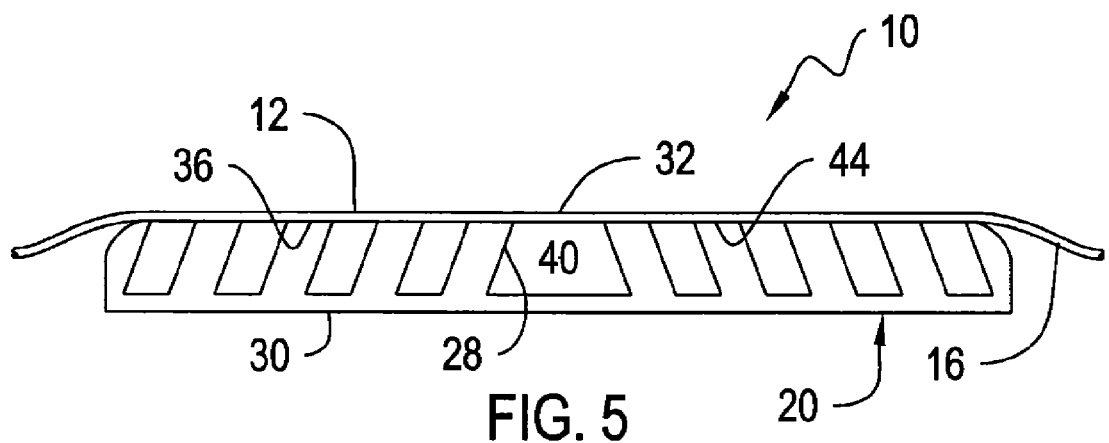
FIG. 5 is a diagram showing a fiber optic laser accelerometer having a transducer constructed according to a fourth embodiment.

FIG. 5 shows an embodiment where transducer 20 has a straight mounting surface 44 instead of the curved mounting surface 36 shown in the other embodiments. Top surfaces 34 of flaps 28 are in a plane. In this embodiment, fiber laser 12 may need to be mounted to transducer 20 on multiple flaps 28. Mounting means other than direct adhesive such as a bracket can be used to avoid interference with fiber laser 12.

It is possible to build transducer 20 with only one flap 28 instead of two opposing flaps 28. However, this cuts the strain response roughly in half and does not provide the rejection against longitudinal acceleration.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An accelerometer comprising:
   a fiber optic laser wherein strain applied to said fiber optic laser results in a shift in an emission wavelength of said fiber optic laser; and
   a transducer joined to said fiber optic laser such that said fiber optic laser extends laterally across said transducer, acceleration of said transducer in a predefined direction being capable of causing strain in said fiber optic laser;
   wherein said fiber optic laser has a center portion; and
   said transducer includes a base extending along said fiber optic laser and provided rigidity of said transducer in at least one direction perpendicular to the predefined direction, and a plurality of flaps, each of said plurality of flaps having a first end and a second end, joined at the first end to the base and supporting said fiber optic laser at the second end, the flaps being capable of translating acceleration in the predefined direction to strain in said fiber optic laser.

2. The device of claim 1 wherein said fiber optic laser has a Bragg grating in a core of the fiber optic laser at each end of a cavity of said fiber optic laser.

3. The device of claim 1 wherein said fiber optic laser has a grating in the core of the fiber optic laser that extends a whole length of a cavity of said fiber optic laser.

4. The device of claim 1 wherein said transducer flaps are angled from said transducer base toward said fiber optic center portion.

5. The device of claim 4 wherein said transducer has the same number of transducer flaps on either side of said fiber optic laser center portion.

6. The device of claim 4 wherein said plurality of flaps second ends provide an interrupted curved surface for supporting said fiber optic laser.

7. The device of claim 4 wherein said transducer further has mounting portions on either end of said transducer, said fiber optic laser being joined to said transducer mounting portions.

8. An accelerometer sensing system comprising:
a pumping laser for providing coherent light at a first frequency;
a distributor joined to said pumping laser to receive coherent light;
a fiber optic laser capable of providing coherent light at a second frequency when subjected to coherent light at the first frequency wherein strain applied to said fiber optic laser results in a shift in an emission wavelength of the second frequency, said fiber optic laser joined to said distributor for receiving coherent light at the first frequency and providing coherent light at the second frequency;
a transducer joined to said fiber optic laser such that said fiber optic laser extends laterally across said transducer, acceleration of said transducer in predefined direction being capable of causing strain in said fiber optic laser; and
an interferometer joined to said distributor for receiving coherent light at the second frequency and producing a light signal responsive to the emission wavelength shift of said fiber optic laser; and
a receiver joined to said interferometer for receiving said light signal;
wherein said fiber optic laser has a center portion; and
said transducer includes a base extending along said fiber optic laser and provided rigidity of said transducer in at least one direction perpendicular to the predefined direction, and a plurality of flaps joined at a first end to the base and supporting said fiber optic laser at a second end, the flaps being capable of translating acceleration in the predefined direction to strain in said fiber optic laser.

9. The system of claim 8 wherein said distributor is a circulator.

10. The system of claim 8 wherein said distributor is a frequency division multiplexer.

11. The system of claim 8 wherein said fiber optic laser is a erbium doped fiber.

12. The system of claim 8 wherein said fiber optic laser is a distributed feedback laser having a grating written in the fiber optic laser cavity with a phase shift positioned at a center of the grating.

13. The system of claim 8 wherein said fiber optic laser is a Fabry-Perot fiber optic laser having a cavity with a Bragg grating written in the fiber optic laser at each end of the cavity.

* * * * *